Figure 1:
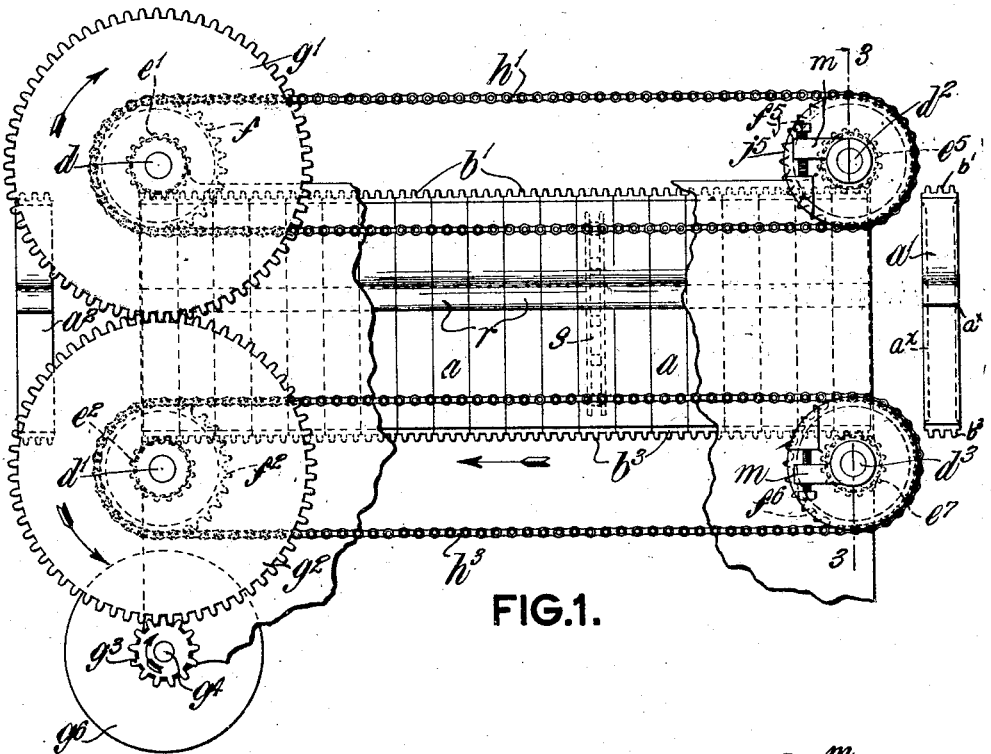

Inventor:
George Ralph Baker.
by his Attorney:

Patented June 10, 1930

1,763,211

UNITED STATES PATENT OFFICE

GEORGE RALPH BAKER, OF LONDON, ENGLAND, ASSIGNOR TO BAKER PERKINS CO. INC., OF SAGINAW, MICHIGAN, A CORPORATION OF NEW YORK

MOLD SUCH AS USED IN THE MANUFACTURE OF WAFER BISCUITS AND FOR OTHER PURPOSES

Application filed September 17, 1927, Serial No. 220,256, and in Great Britain September 21, 1926.

This invention relates to molds such as used for making wafer biscuits and the like or for other purposes such as the production of metallic plates or grids, and which may be termed "split" molds; that is to say, each mold comprises a plurality of parts, usually two, for example in the form of recessed plates or "irons", which may be separated for insertion of the material to be molded but kept closed during molding, drying or baking treatment, and separated for removal of the finished article.

In the use of such molds they are commonly or frequently caused to travel in a course or courses of varying contour which in certain cases involves the transfer of molds or mold members from one position to another during their travel, such as for feeding and discharging purposes; and it is very necessary to provide means for maintaining close contact between the mold members during the molding or treating period or during the period the molds are to remain closed.

According to the present invention, which is intended more particularly for use with flat molds, although not necessarily limited to such, the said object is attained automatically in a simple and efficient manner by providing racks on the mold members and pinion mechanism and spring urged elements at or adjacent the commencement of the course which co-operate with other pinion mechanism at or adjacent the termination of the course to produce a pressure in the direction of travel on the mold members so as to bring them into close or intimate contact and maintain them in this condition, with the aid of auxiliary locking devices if required, during the period the molds are to remain closed.
These pressure exerting devices may also be used if required, and preferably are used, as the driving means for moving the molds through their course.

In a practical embodiment of the invention, each mold member is provided with toothed portions or sections, which sections, when said mold members are all in proper juxtaposition, constitute a toothed rack. Co-operating with this rack at one end of the course within which the mold members are to be held pressed together is a pinion mounted on a shaft, and a similar pinion is carried by another shaft located at or adjacent the other end of the said course and also adapted to engage the rack. Drive is transmitted from one of said shafts to the other through spring gear connections which may suitably be as follows:—On one of the shafts is a sprocket connected by a chain to a similar chain wheel loose on the other shaft. To the latter chain wheel is connected a disc having a lug thereon, and alongside said disc on the same shaft is another disc with a lug thereon, a compression spring being mounted between the two lugs. The second disk is connected by an adjustable member to an arm fixed on the corresponding shaft.

It will thus be seen that the two shafts are connected in such a way that the spring tends to cause one of the shafts to overrun the other, which tendency is counteracted by the engagement of the pinions with the rack. The tension thus exerted by the spring tends to hold the molds together. This tension can be regulated by the adjustable member.

Two or more of such gearings may be used in connection with one set of molds.

With such a construction, as the molds travel through their course the mold members, between the positions of the two pinion shafts, will be subjected to a pressure tending to hold them in close contact, since the mechanism associated with the first shaft has a tendency to force them in the direction of travel against the mechanism associated with the second shaft, thus setting up a reaction which tends to keep the mold members in close contact by a pressure which can be adjusted by the member mentioned.

By suitable modification of the rack and pinion devices, and interconnection thereof where necessary, the mechanism may be adapted for application to a straight or sinuous course; and by application of power to one or other of the said shafts, the drive for the whole series of molds may also be effected through the mechanism described.

The annexed drawing illustrates the invention as applied to molds moving in a rectilinear course apparatus for bringing the molds to or removing from said course being omitted.

Figure 2:
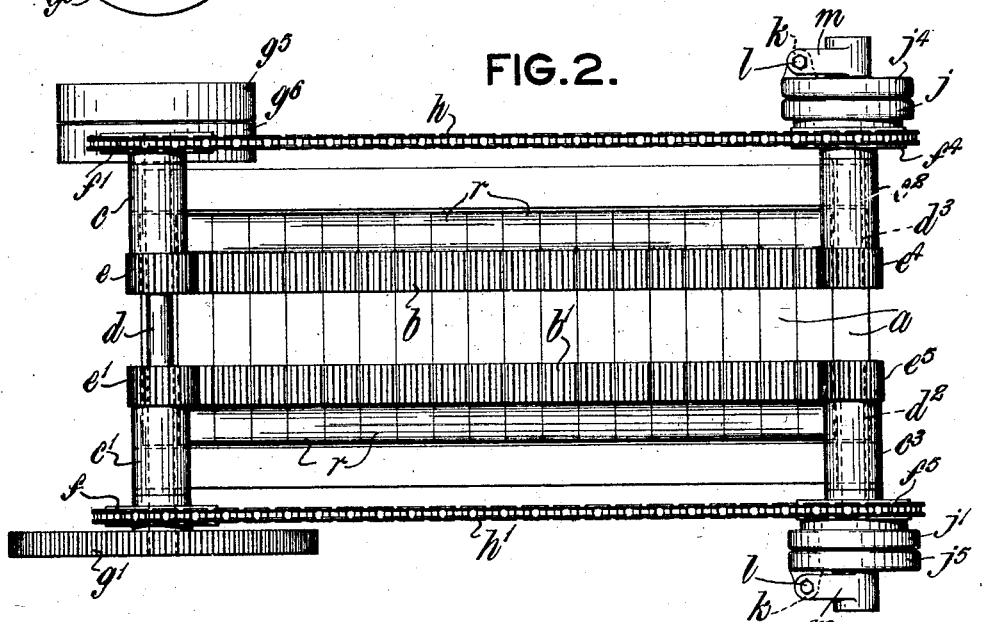
Figure 3:
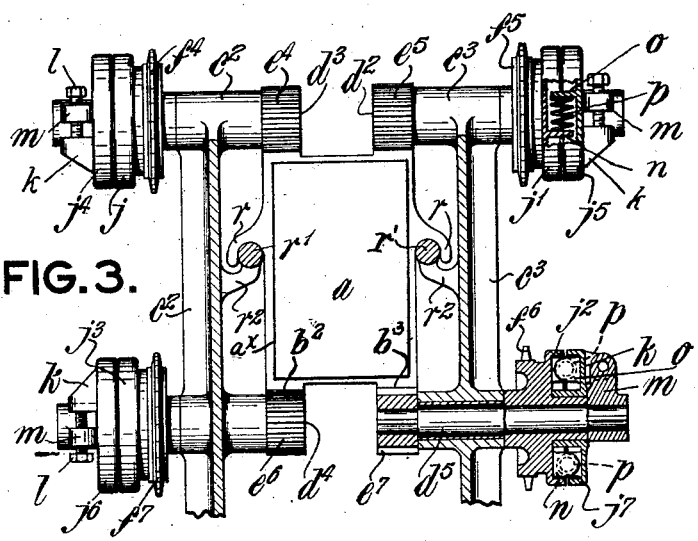
Figure 4:
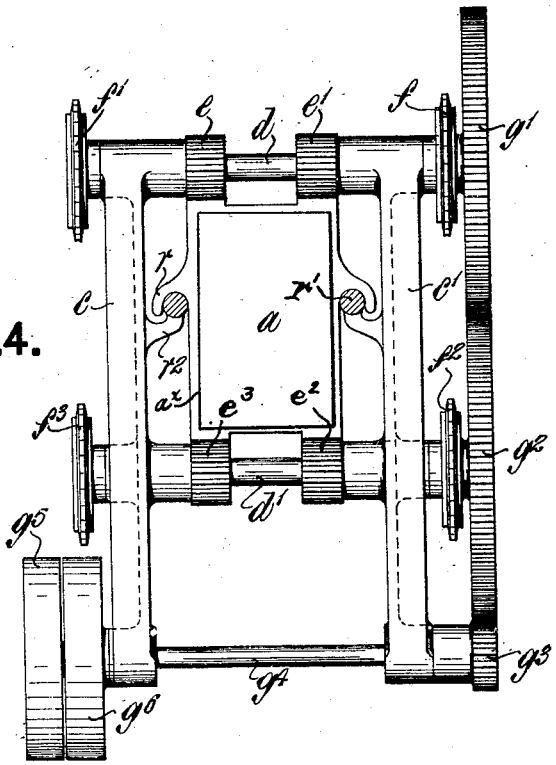

Fig. 1 is an elevation and Fig. 2 a plan showing a system in which four racks are used. Fig. 3 is a cross section on line 3—3 of Fig. 1 and Fig. 4 is an end elevation.

$a$ represents a mold, which has in its opposite face suitable recesses $a^x$ so that when two such molds are placed together the cavity between them is of the form necessary for the production of the molded article. In the example illustrated the molds are quadrangular and on their upper and lower edges are rack teeth $b, b^1, b^2, b^3$ so placed that when the molds are in contact with one another four continuous racks are formed. $a^1$ indicates a mold about to be entered at the commencement of the course and $a^2$ a mold removed from the termination of the course.

Suitable framework carries four uprights $c, c^1, c^2, c^3$ having bearings for six shafts $d, d^1, d^2, d^3, d^4, d^5$. On the shafts $d, d^1$ are pinions $e, e^1, e^2, e^3$, and on the shafts $d^2, d^3, d^4, d^5$ are pinions $e^4, e^5, e^6, e^7$, the several pinions meshing with their corresponding racks $b, b^1, b^2, b^3$. On the shafts $d, d^1$ at one end of the course are sprockets $f, f^1$ and $f^2, f^3$, respectively, and also gear wheels $g^1, g^2$ meshing with each other; the gear wheel $g^2$ also meshing with a pinion $g^3$ on the drive shaft $g^4$ that carries the fast and loose pulleys $g^5, g^6$. The sprockets $f, f^1, f^2, f^3$ are connected by chains $h, h^1, h^2, h^3$, respectively, to sprockets $f^4, f^5, f^6, f^7$ loose on the shafts $d^2, d^3, d^4, d^5$.

Alongside each sprocket $f^4, f^5, f^6, f^7$, and secured thereto, is a disk $j, j^1, j^2, j^3$; and alongside said disks and also loose on the respective shafts are other disks $j^4, j^5, j^6, j^7$, each having an exterior lug $k$ connected by a screw bolt $l$ to an arm $m$ fixed on the corresponding shaft.

The several disks $j, j^1, j^2, j^3, j^4, j^5, j^6, j^7$ are preferably flanged; and in the cavities between the corresponding pairs of flanges, said disks are provided with lugs $n, o$, each of which extends sufficiently far to overlap the track of its fellow on the other disk; compression springs $p$ being arranged between corresponding pairs of lugs $n, o$.

It will be apparent from the foregoing that the drive transmitted from shafts $d, d^1$ through the fixed sprockets $f, f^1, f^2, f^3$ and chains $h, h^1, h^2, h^3$ to the loose sprockets $f^4, f^5, f^6, f^7$ is carried through the springs $p$ to the disks $j^4, j^5, j^6, j^7$ and thus through the arms $m$ to the shafts $d^2, d^3, d^4, d^5$ and so to the pinions $e^4, e^5, e^6, e^7$. The springs $p$ exert their force in such direction that the pinions $e^4, e^5, e^6, e^7$ tend to turn counter to the pinions $e, e^1, e^2, e^3$, thus keeping all the molds $a$ in the course between the pinions $e, e^1, e^2, e^3$ and the pinions $e^4, e^5, e^6, e^7$ securely under pressure against one another.

The molds $a$ are preferably provided with lateral lugs $r$ to ride upon rods $r^1$ carried by lugs $r^2$ on the uprights $c, c^1, c^2, c^3$ respectively.

There is indicated diagrammatically at $s$ an electric heating element with which the interior of each mold $a$ may be provided, suitable contacts being made with lateral conductor bars (not shown).

What I claim as my invention and desire to secure by Letters Patent of the United States is:—

1. In molding apparatus, the combination of a straight linear track, a plurality of molding bodies comprising molding faces adapted to coact with those of adjacent molding bodies to form mold cavities, the said mold bodies being provided with rack teeth, a pinion for engaging the rack teeth on a mold body at one end of a defined section of the track, a pinion for engaging the rack teeth of a mold body at the other end of said section, and gearing connecting said two engaging pinions comprising means for exerting resilient pressure in a direction to hold the mold bodies in said track section in close contact with one another.

2. In molding apparatus, the combination of a straight linear track, a plurality of molding bodies comprising molding faces adapted to coact with those of adjacent molding bodies to form mold cavities, the said mold bodies being provided with rack teeth, a pinion for engaging the rack teeth on a mold body at one end of a defined section of the track, a pinion for engaging the rack teeth of a mold body at the other end of said section, and gearing connecting said two engaging pinions comprising means for exerting resilient pressure in a direction to hold the mold bodies in said track section in close contact with one another and means operable to propel the group of mold bodies through said track section.

3. In molding apparatus, the combination of a straight linear two-bar track, a plurality of molding bodies, comprising molding faces adapted to coact with those of adjacent molding bodies to form mold cavities and lugs riding on said track bars, the said mold bodies being provided with rack teeth, pinions for engaging the rack teeth on a mold body at one end of a defined section of the track, pinions for engaging the rack teeth of a mold body at the other end of said section, sprockets connected to the pinions at one end of the track section, sprockets at the other end of said track section, resilient means for connecting the latter sprockets with the pinions at that end of the track section, and chains connecting said sprockets so as to hold the mold bodies in said track section in close contact with one another.

4. In molding apparatus, the combination of a track, a plurality of molding bodies comprising molding faces adapted to coact with those of adjacent molding bodies to form mold cavities, the said mold bodies being provided with rack teeth, pinions for engaging the rack teeth on a mold body at one end of a defined section of the track, pinions for engaging the rack teeth of a mold body at the other end of said section, sprockets connected to the pinions at one end of the track section, sprockets connected to the pinions at the other end of said track section, resilient means for connecting the latter sprockets with the pinions at that end of the track section, and chains connecting said sprockets so as to hold the mold bodies in said track section in close contact with one another.

5. In molding apparatus, the combination of a track, a plurality of molding bodies comprising molding faces adapted to coact with those of adjacent molding bodies to form mold cavities, the said mold bodies being provided at opposite ends with rack teeth, pinions for engaging the rack teeth on both ends of a mold body at one end of a defined section of the track, pinions for engaging the rack teeth on both ends of a mold body at the other end of said section, sprockets connected to the pinions at one end of the track section, sprockets connected to the pinions at the other end of said track section, resilient means for connecting the latter sprockets with the pinions at that end of the track section, and chains connecting said sprockets so as to hold the mold bodies in said track section in close contact with one another.

6. In molding apparatus, the combination of a straight track, a plurality of disconnected molding bodies comprising molding faces adapted to coact with those of adjacent molding bodies to form mold cavities; each molding body being provided at top and bottom with a rack so arranged that the plane connecting the two racks intersects the vertical face of the mold member at points remote from the side edges thereof; a pinion for engaging the rack on a mold body at one end of a definite section of the track, a pinion for engaging the rack on a mold body at the other end of said section, and gearing connecting the two pinions and embodying means for exerting resilient pressure in a direction to hold the mold bodies in said track section in close contact with one another.

7. In molding apparatus, the combination of a straight track, a plurality of disconnected molding bodies comprising molding faces adapted to coact with those of adjacent molding bodies to form mold cavities; each molding body being provided at top and bottom with a rack so arranged that the plane connecting the two racks intersects the vertical face of the mold member at points remote from the side edges thereof; a pinion for engaging the rack on a mold body at one end of a defined section of the track, a pinion for engaging the rack on a mold body at the other end of said section, gearing connecting the two pinions and embodying means for exerting resilient pressure in a direction to hold the mold bodies in said track section in close contact with one another, and means operable to propel the group of mold bodies through the said track section.

In witness whereof I have signed this specification.

GEORGE RALPH BAKER.